Feb. 9, 1937.  L. SAIVES  2,070,341
DRIVE MECHANISM FOR MOTOR VEHICLES
Filed Jan. 15, 1932  3 Sheets-Sheet 1
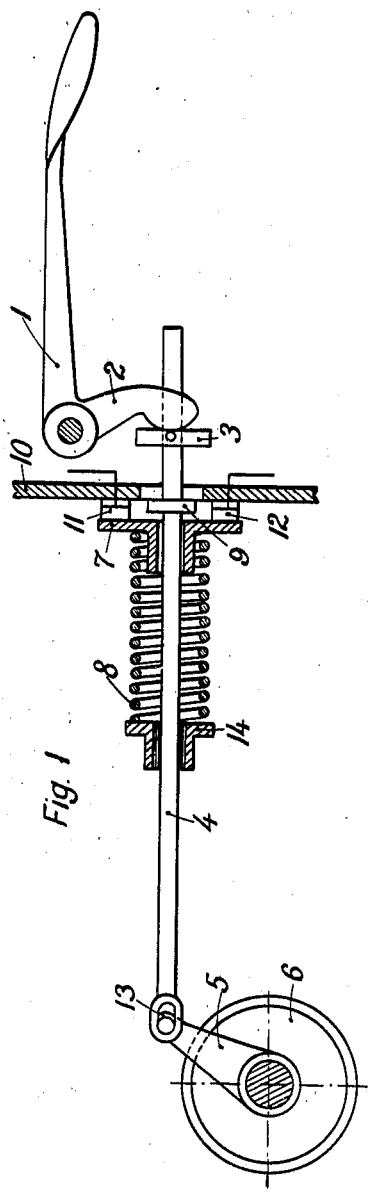
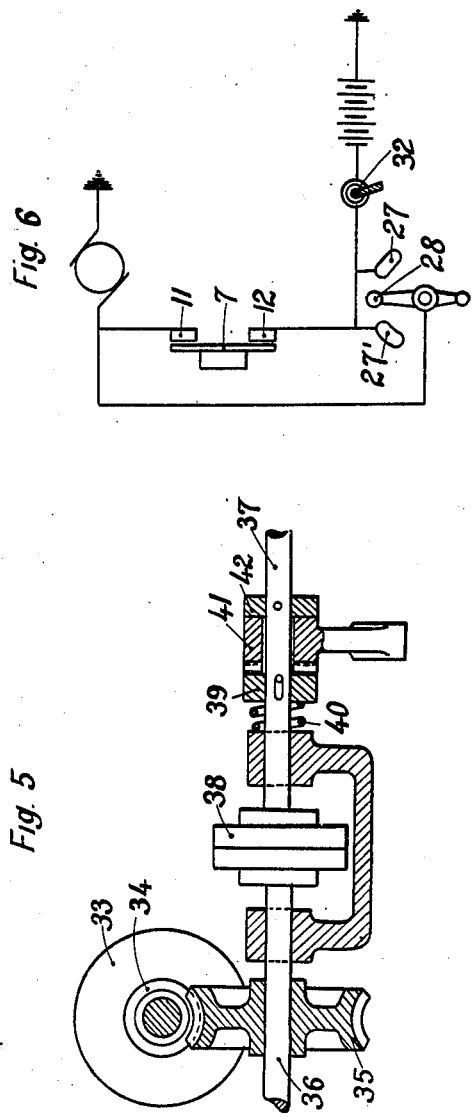

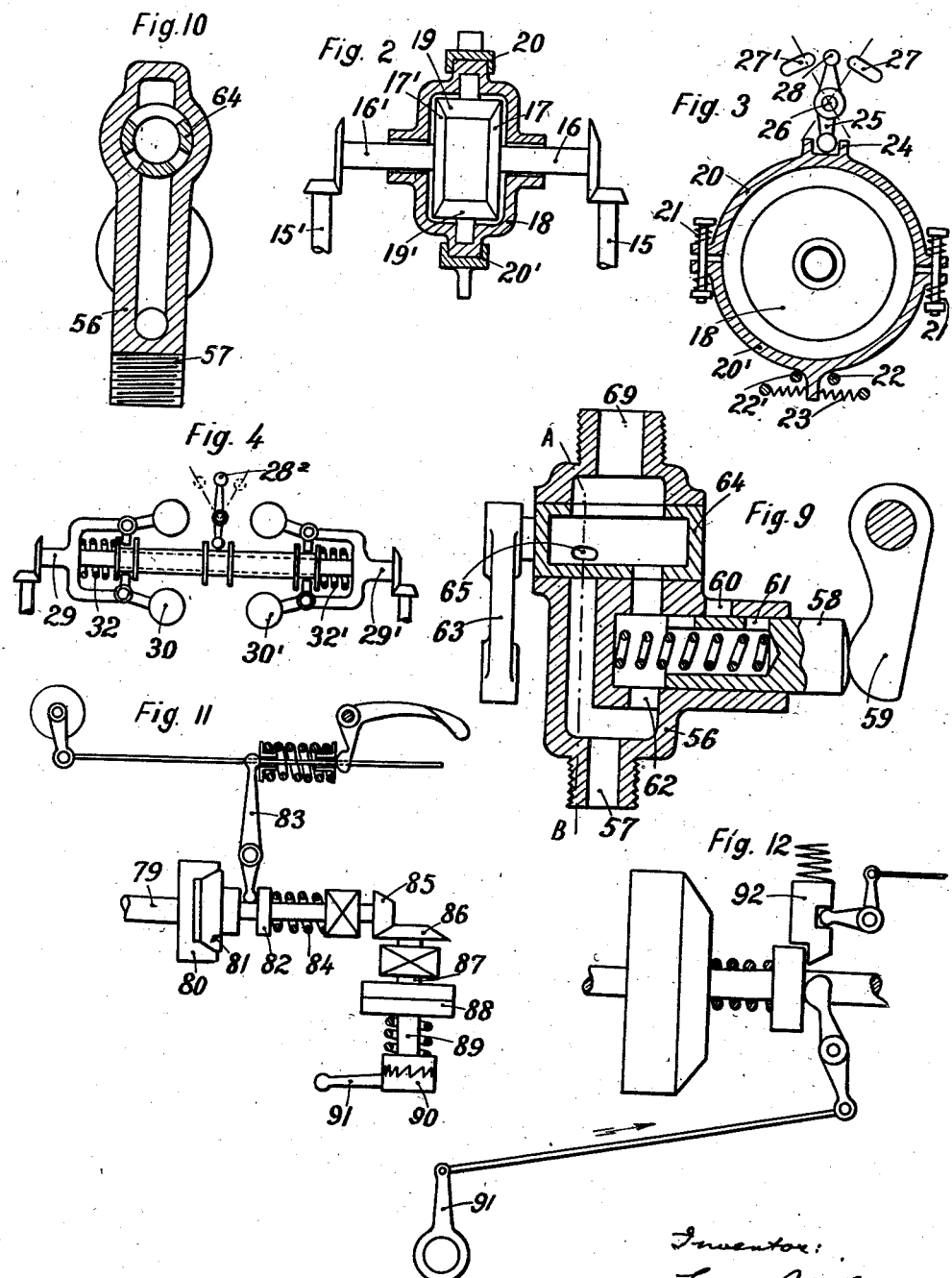

Feb. 9, 1937.  L. SAIVES  2,070,341
DRIVE MECHANISM FOR MOTOR VEHICLES
Filed Jan. 15, 1932   3 Sheets-Sheet 3

Patented Feb. 9, 1937

2,070,341

UNITED STATES PATENT OFFICE 2,070,341

DRIVE MECHANISM FOR MOTOR VEHICLES

Léon Saives, Billancourt, France, assignor to Louis Renault, Billancourt, France Application January 15, 1932, Serial No. 586,885
In France February 14, 1931

2 Claims. (Cl. 192—.01)

The invention relates to improvements in the drive mechanism for self-propelled vehicles operated by internal combustion engines.

The purpose of the invention is to facilitate the drive of such vehicles by eliminating the manual operation of the clutch, which is effected automatically when the accelerator pedal is actuated.

The advantages of the free wheeling, whilst still retaining that of automatic declutching, the latter being effected by a controlled servo-motor, or by the operation of a lever to restore the drive of the vehicle to normal conditions, without automatic declutching and without free wheeling.

The improvements according to the invention comprise also a control mechanism for the speeds of the driving and driven shafts, which allows of changing over from free wheel by declutching to clutching only when the respective speeds of these two shafts are substantially the same.

The automatic declutching, owing to the release of the accelerator pedal, permits of changing speeds more easily, since it is no longer necessary to operate the clutch pedal, which latter may be omitted or maintained in case it is desired to return to normal drive.

In the drawings forming part of my application, in which like reference numerals indicate like parts throughout the several views;

Fig. 1 is a view showing the accelerator pedal in side elevation, and the valve operating mechanisms in section.

Fig. 2 is a view, partly in section, showing the planet wheels and the shafts 16 and 16', provided with the beveled wheels 17 and 17' of the differential gear. These shafts are equipped with mechanisms permitting them to rotate in opposite directions.

Fig. 3 shows a section through the member 20, which is rotatable by the casing member 18.

Fig. 4 illustrates the synchronising apparatus operated by the drive and driven shafts.

Fig. 5 is a view showing the clutching mechanisms for the shafts 36 and 37.

Fig. 6 is a view illustrating the electric circuits 11—12.

Fig. 9 is a view illustrating the operation of the plug 58, by pressure of the lever 59.

Fig. 10 is a sectional view of the control valve and casing.

Fig. 11 is a view partly in section, showing the method of actuating the slide 82 by the lever 83, and, Fig. 12 shows a modification of the apparatus which utilizes the engine as a declutching servo-motor.

Figure 7:
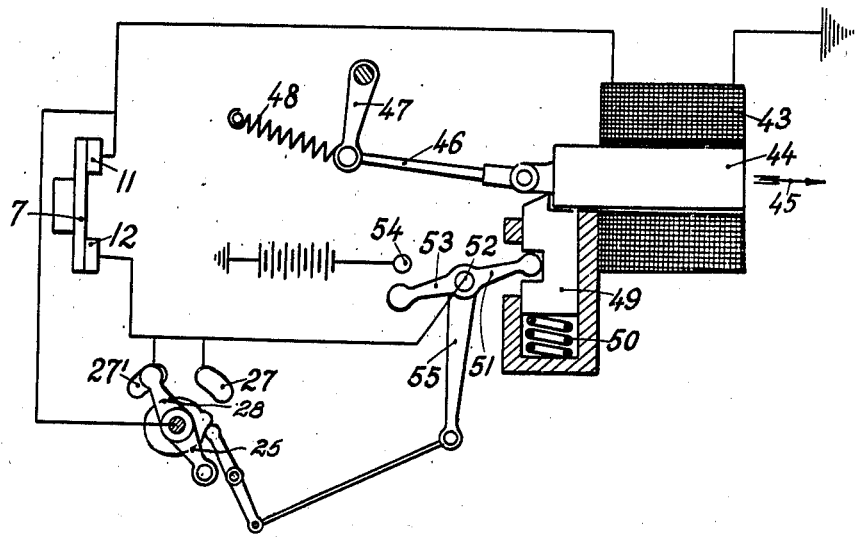
Fig. 7 illustrates the mechanism for actuating the core 44 into locked or unlocked position.

The accelerator pedal 1 operates, by the lever 2, a member 3 attached to a rod 4, which controls through the lever 5 the movement of the rotary valve or of the regulating member 6 of the carburetor; a member 7 electrically insulated can slide on this rod 4 and is constantly urged by a spring 8 against a shoulder 9 on the rod 4. The spring 8 abuts on the other end against a collar 14 attached to, but insulated from, the rod 4, unless the spring is itself insulated from the member 7.

Two contacts 11 and 12 are attached to the fixed part 10 of the underframe but are electrically insulated therefrom. These contacts are connected respectively to one terminal of the battery and to one terminal of an electric motor, which constitutes the declutching servo-motor the other terminal of the battery and motor being grounded.

The operation is as follows: the pedal 1 being at rest, the declutching is effected by actuation of the electric servo-motor. When the pedal 1 is depressed the rod 4 is displaced as well as the members attached thereto. The member 7 urged by the shoulder 9 on the rod 4 opens the circuit of the electric motor effecting the declutching which becomes inoperative. The action of the automatic control mechanism, dependent upon the speeds of the driving and driven shafts, will be hereinafter explained.

By continuing to depress the pedal 1, the rod 4 operates the lever 5 controlling the rotary valve of the carburetor 6.

In order that the action of the rod 4 should not be felt at the carburetor before the electric contact at 11 and 12 has been broken, an elongated recess is provided at the end of the rod 4 to receive the lug 13 on the lever 5, the freedom of movement of which lug corresponds to that existing between the member 7 and the shoulder 9 on the rod 4 when the pedal is at rest. In this manner the operation of the control lever on the rotary valve takes place only when the declutching servo-motor has ceased to work.

When, on the contrary, the accelerator pedal is released, the first part of the stroke begins by closing progressively the rotary valve of the carburetor, then at the end of the stroke, by making the contact closing the circuit at 11 and 12 of the declutching electric motor.

At this moment the vehicle will be free-wheeling, since the engine of the vehicle being declutched, there is no connection between it and the transmission; or the speed lever might be operated to change from one speed to another. In order that the transmission may again be operated by the engine it suffices to depress the accelerator pedal.

But at this moment the speeds of the engine and transmission shafts might be widely different, and consequently it would be dangerous for the clutch to be engaged at this moment; to avoid this risk recourse is had to an automatic interruption of the circuit, which will allow the circuit to be completed only when the speeds of the two shafts are substantially the same.

For this purpose two shafts 15 and 15' (Fig. 2) are driven through any suitable gear, the one by the driving shaft the other by the driven shaft, they in turn drive, by means of bevel wheels, the shafts 16 and 16' provided at their adjacent ends with the bevel wheels 17 and 17' of a differential gear. The two shafts 16 and 16' will be arranged to rotate in opposite directions.

If the speeds of the driving and transmission shafts are the same, the shafts 16 and 16' rotate at the same speed in opposite directions and the case 18 of the differential gear carrying the planet wheels 19, 19' remains at rest.

A member 20 is carried by the gear case 18 and can slide rotatably thereon, it may consist for example of two parts 20 and 20' constantly urged against 18 by means of springs 21.

This member 20 will be rotated by 18 within the limits fixed by the stops 22, 22' and brought back into an intermediate position by the springs 23, when the gear case 18 is at rest, which corresponds with equality of speeds of the two shafts.

The member 20 is provided with a notch 24 which operates by its displacement a lever 25 pivoted at 26 and operating a lever 28, the end of which can make contact with the contacts 27 and 27' of a double commutator.

Fig. 6 shows a diagram of the connections.

When, under the action of the first part of the stroke of the accelerator pedal, the member 7 is removed from the contacts 11 and 12, and having meantime accelerated the engine, the declutching servo-motor stops, provided always that the speeds of the two shafts are substantially equal and that the lever 28 is in the intermediate position between the contacts 27 and 27'. Finally the lever 28 will interrupt definitely the circuit of the electric motor by taking up the intermediate position; in Fig. 6 the pedal has interrupted first of all the circuit at 11—12, then the speeds of the two shafts being equal, the lever 28 has assumed the vertical position between the contacts 27—27'.

Fig. 4 shows a modification of the synchronizing apparatus; the shafts 29, 29' are operated by the driving and driven shafts to be clutched, they drive weights 30, 30' which, under the action of centrifugal force, displace by means of small levers a single sliding block urged at its two ends by springs 32, 32' which tend to bring it back to the middle position.

This position corresponds to the equality of speeds of the two shafts, but if one of them rotates faster than the other, the centrifugal force of one set of weights becomes preponderate and displaces the slide block, which carries over the lever 28², which will act upon the double commutator in the same way as in the preceding example Figs. 2 and 3. From the electrical point of view, the operation will be that of Fig. 6.

To restore the drive of the vehicle to the normal arrangement a switch is inserted in the supply circuit to cut off the current completely. At this moment the pedal 1 will act only as an accelerator pedal, the declutching being effected in the customary way by the special pedal.

The electric motor which is started up by the means aforesaid, effects the declutching in the following way, Fig. 5.

The electric motor 33 has on its shaft a worm 34 gearing with a worm-wheel 35 fixed on a shaft 36, which transmits its motion to a shaft 37 by the intermediary of a slipping clutch 38. Upon the shaft 37 there is fixed a one-way clutch 39 rotating with it, but capable of sliding upon it. A spring 40 constantly urges the catch against a lever 41 loose on the shaft but held axially by the collar 42.

The lever 41 is connected to the clutch pedal by any suitable means.

The operation is as follows: the electric motor drives through the worm and worm-wheel the shaft 36 and consequently the shaft 37, and by means of the lever 41, effects the declutching of the engine and transmission. As soon as this declutching has been effected, the electric motor 33 continuing to rotate, slipping takes place in 38.

The one-way clutch 39 is provided so that it may be possible to operate the declutching by means of the normal pedal without having to drive the servo-motor. This one-way clutch may be located at any point of the gear for controlling the declutching.

The electric motor may be replaced by an electromagnet constituting a declutching servo-motor. Fig. 7 shows an example of the use of the electromagnet.

The electrical connections controlled by the accelerator pedal and the synchronizing device are the same as in Fig. 6 and have the same reference numbers. It is assumed that the pedal has been left stationary.

43 is an electromagnet actuating a core 44 in the direction of the arrow 45, when it is traversed by the current from the battery. It effects the declutching by means of the rod 46 connected to the declutching lever 47. 48 represents the resistance due to the clutching spring.

In order to avoid consumption of current after the declutching has been effected, the following apparatus is provided: a bolt 49 urged by a spring 50 locks the core 44 in the declutching position. By its displacement the bolt 49 operates a lever 51 pivoted at 52, which carries with it the lever 53 which cuts off the current from the battery at 54.

There is therefore no longer any consumption of current once the declutching has been effected.

When the accelerator pedal is depressed to clutch the engine of the vehicle, the circuit will be opened by 7 at 11, 12. It will also be opened at 27, 28, and 27' by the synchronizing apparatus when the speeds of the shafts to be clutched are substantially the same. In its movements the lever 25 will operate the lever 55 by any suitable control, such as a cam on its hub acting upon 55, whatever may be the direction of displacement of 25, causing the disengagement of the bolt 49, the release of the core 44 and the clutching of the engine of the vehicle under the action of the spring operating the clutch.

Figure 8:
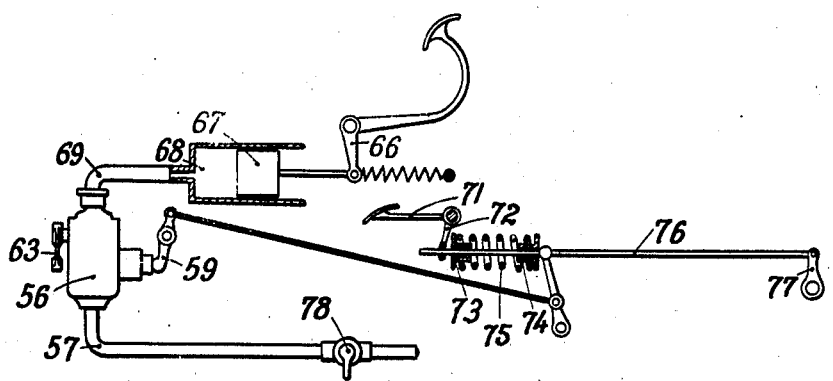
Fig. 8 is a view showing the method of operation of the piston of the servo-motor under the influence of movement of the pedal or lever 66.

Figs. 8, 9 and 10 show a modification in which use is made of the vacuum existing in the intake manifold pipe of the engine of the vehicle as declutching servo-motor.

56 is a control valve in which vacuum is produced through the pipe 57. A sliding plug 58 subjected to the action of the accelerator pedal by the lever 59 allows of removing the action of the vacuum in the cylinder of the servo-motor by placing it in communication with the atmosphere, when by pushing the plug 58 the holes 60 and 61 are brought face to face, whilst the hole 62 is closed. In this case the declutching servo-motor stops working; but if the speeds of the two shafts to be clutched are not substantially the same, the lever 63, connected with a synchronizing device of the same type as those already described, by operating a plug 64, instead of being in the position of the Fig. 9, which is the closed position, is displaced in one direction or the other rotating this plug 64, and places the cylinder of the servo-motor in connection with the vacuum through the holes 65. When the accelerator is depressed, the clutching will take place only at the moment when, the speeds of the two shafts becoming equal, the lever 63 assuming its intermediate position, will in its turn close the vacuum pipes (position of the Figs. 9 and 10).

Fig. 8 shows the whole of the vacuum apparatus.

The clutch pedal or more exactly the lever 66 is connected to the piston 67 of a servo-motor, the cylinder of which shown at 68 is connected by a pipe 69 with the control valve 56 already described. The lever 59 is connected by any suitable means to a lever 70 operated by the accelerator pedal 71.

This latter in the first part of its stroke operates by means of the lever 72, and the members 74 attached to the rod 76, of the spring 75 and of the member 73 sliding on 76, the lever 70 actuating the lever 59 of the valve 58 shutting off the vacuum from the cylinder of the servo-motor. The action of the vacuum will only be removed however, when, the engine having been accelerated, the speeds of the shafts to be clutched will be substantially equal.

When the valve 58 is at the end of its stroke the accelerator pedal by compressing the spring 75, operates the lever 77 controlling the throttle valve of the carburetor.

A cock 78 inserted in the vacuum pipe allows of removing the action of this latter when it is wished to come back to the normal drive of the vehicle with separate accelerator and clutch pedals.

Figs. 11 and 12 show a modification with a mechanical apparatus utilizing the engine of the vehicle as the declutching servo-motor. The shaft 79 in constant connection with the engine drives the member 80 of an auxiliary clutch the other member 81 of which can be operated by means of the slide 82 by the lever 83 connected to the accelerator pedal by a control similar to those which have been described in the other modifications. The slide 82 is constantly urged towards the clutching position by a spring 84.

A set of gear wheels 85, 86 transmits the motion with suitable reduction to the shaft 87 connected by a slipping clutch 88 to the shaft 89 driving by the intermediary of a ratchet 90 the lever 91 controlling the main clutch.

The operation is similar to that described with respect to the electric servo-motor. Assuming as in Fig. 11 the engine to be declutched, when the accelerator pedal is depressed, 80 and 81 are declutched before the throttle valve of the carburetor is influenced and the main clutch can become engaged.

But if the speeds of the two shafts to be clutched are not substantially equal, the bolt 92 similar to that already described Fig. 7 prevents the main clutch from engaging until a control device of the speeds of the two shafts (one of those already described) allows the unlocking of the bolt and consequently the clutching of the engine and the transmission.

The examples of construction of the servo-motors employed, electric, vacuum or mechanical, which are given, are not limiting, the details of construction may be varied without exceeding the scope of the invention, or a device of one modification may be replaced by one from another modification.

I claim:
1. In a vehicle driven by an internal combustion engine, a driving mechanism comprising an accelerator pedal, a clutch for said engine, a shaft constantly driven by said engine, an auxiliary clutch on said shaft, means for operating said auxiliary clutch by the accelerator pedal, means for transmitting motion from said auxiliary clutch to a lever actuating said engine clutch and means for holding the engine clutch released as long as the speeds of the two shafts to be clutched are not substantially the same.

2. In a vehicle driven by an internal combustion engine, a driving mechanism as claimed in claim 1, in which the means for transmitting motion from said auxiliary clutch to the lever actuating the clutch comprise a slipping coupling and a one-way clutch device.

LÉON SAIVES.